(12) United States Patent
Lehmann

(10) Patent No.: US 10,712,432 B2
(45) Date of Patent: Jul. 14, 2020

(54) TIME-OF-LIGHT-BASED SYSTEMS USING REDUCED ILLUMINATION DUTY CYCLES

(71) Applicant: ams Sensors Singapore Pte. Ltd., Singapore (SG)

(72) Inventor: Michael Lehmann, Winterthur (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 969 days.

(21) Appl. No.: 15/038,260

(22) PCT Filed: Dec. 10, 2014

(86) PCT No.: PCT/EP2014/077180
§ 371 (c)(1),
(2) Date: May 20, 2016

(87) PCT Pub. No.: WO2015/086663
PCT Pub. Date: Jun. 18, 2015

(65) Prior Publication Data
US 2016/0299218 A1 Oct. 13, 2016

Related U.S. Application Data

(60) Provisional application No. 61/914,433, filed on Nov. 12, 2013.

(51) Int. Cl.
*G01C 3/08* (2006.01)
*G01S 7/484* (2006.01)
*G01S 17/89* (2020.01)
*G01S 17/36* (2006.01)
*G01S 7/4911* (2020.01)
*G01S 7/4914* (2020.01)
(Continued)

(52) U.S. Cl.
CPC ............ *G01S 7/484* (2013.01); *G01S 7/4863* (2013.01); *G01S 7/4865* (2013.01); *G01S 7/4911* (2013.01); *G01S 7/4914* (2013.01); *G01S 17/10* (2013.01); *G01S 17/36* (2013.01); *G01S 17/89* (2013.01)

(58) Field of Classification Search
CPC ... G01P 5/26; G01P 3/36; G01F 1/661; G01S 7/4808; G01S 7/497; G01S 17/023; G01S 17/58; G01S 17/95; Y02A 90/19
See application file for complete search history.

(56) References Cited

PUBLICATIONS

Andrew D. Payne et al., "Improved measurement linearity and precision for AMCW time-of-flight range imaging cameras", Applied Optics, Optical Society of America, Washington, DC, vol. 49, No. 23, Aug. 1, 2010, pp. 4392-4403.

(Continued)

*Primary Examiner* — Samantha K Abraham
(74) *Attorney, Agent, or Firm* — Michael Best and Friedrich LLP

(57) ABSTRACT

Time-of-flight (TOF) based systems using light pulse compression are described and, in some cases, can help increase demodulation contrast. Further, light pulse shaping techniques are described that, in some cases, can help reduce phase non-linearity and distance-calculation errors. The techniques can be used, for example, in measurement systems, as well as imaging systems in which a time-of-flight and/or distance information is obtained. The time-of-flight and/or distance information can be used to reconstruct and display a three-dimensional image of a scene. The light compression techniques also can be used to provide reference signals.

17 Claims, 6 Drawing Sheets

(51) Int. Cl.
G01S 7/4863 (2020.01)
G01S 7/4865 (2020.01)
G01S 17/10 (2020.01)

(56) References Cited

PUBLICATIONS

International Search Report for PCT/EP2014/077180 dated Mar. 27, 2015, 3 pages.

Introduction to the Time-of-Flight (ToF) System Design, User's Guide, Texas Instruments, Literature No. SBAU219D; Dec. 2013, revised May 2014, 32 pages.

Buttgen et al., "CCD/CMOS Lock-In Pixel for Range Imaging: Challenges, Limitations and State-of-the-Art", Swiss Center for Electronics and Microtechnology, Badenerstrasse 569, 8048 Zurich, Switzerland, Porc. of 1st Range Imaging Research Day, pp. 21-32 (2005).

Payne et al., "Illumination waveform optimization for time-of-flight range imaging cameras", VVideometrics, Range Imaging, and Applications XI, Proc. of SPIE, vol. 8085, No. 1, Jun. 9, 2011, 37 pp.

TIME-OF-LIGHT-BASED SYSTEMS USING REDUCED ILLUMINATION DUTY CYCLES

CROSS-REFERENCE TO RELATED APPLICATION(S)

This is the U.S. National Phase Application Under 35 U.S.C. § 371 of International Patent Application No. PCT/EP/2014/077180, filed on Dec. 10, 2014, which claims the benefit of priority of U.S. Provisional Patent Application No. 61/914,433, filed on Dec. 11, 2013, the entire contents of which are incorporated herein by reference. The International Application was published in English on Jul. 18, 2015 as WO2015/086663 A1 under PCT Article 21(3).

TECHNICAL FIELD

The present disclosure relates to time-of-flight-based systems using light pulse compression.

BACKGROUND

Real-time, three-dimensional imaging has become an important challenge in the design of modern electronic image sensors. Many applications, such as robotics, biometrics, automobile security and navigation, medical imaging and surveillance demand a three-dimensional representation of the environment to avoid time-consuming processing steps that typically are used in ultra-sonic or radar imaging techniques. Optical systems can allow for very fast three-dimensional data acquisition, an (eye)-safe system set-up and high lateral resolution.

Time-of-flight techniques, for example, can facilitate fast optical acquisition of distance information. In TOF systems, the time that light needs to travel from the measurement system to the scene and back again corresponds directly to the distance R. The time-of-flight (TOF) may be determined by:

$$TOF = 2R/c,$$

where c is the velocity of light. Sensors for real-time three-dimensional imaging systems typically include pixel-matrices composed of "smart" pixels that are capable of simultaneously delivering distance information for respective points in an imaged scene. In some TOF systems, a modulated light wave is emitted toward a scene, and the phase delay between the original and received light signals is used to extract the time or distance information. A special group of "smart" pixels, called demodulation or lock-in pixels, can be used to demodulate the optical wave impinging on the sensor.

Demodulation contrast ($c_{demod}$) is an important parameter for TOF pixels and defines the quality of the pixel's inherent demodulation efficiency. The demodulation contrast can be defined by the ratio between the amplitude (A) and offset (B) values when no background light is present, where the offset (B) corresponds to the mean number of electrons $A_{sig}$ generated exclusively by the signal component. Thus:

$$c_{demod} = \frac{A}{B}\bigg|_{without\ background\ light} = \frac{A}{A_{sig}}$$

The theoretical maximum for the demodulation contrast depends on the specific nature of the sampling process. The shorter the integration period, the higher the demodulation contrast can be. For example, in 2-tap pixels, in which each demodulation pixel samples and stores two samples in half the modulation period, the demodulation contrast (assuming sinusoidal light pulses) cannot exceed about 63%. In practice, various parasitic effects tend to reduce the actual demodulation contrast even further.

SUMMARY

The present disclosure describes TOF-based systems using light pulse compression, which in some cases can help increase the demodulation contrast and obtain stronger signals.

For example, in one aspect, a time-of-flight system includes a light source operable to emit light toward a target, and a detector array operable to detect light signals reflected by the target. The system further includes a control unit coupled to the light source to modulate the light source such that the light source emits light pulses having a duty cycle of less than 50%. The control unit also is coupled to the detector array and is operable to coordinate modulation of the light source with sampling of pixels in the detector array so as to provide synchronous demodulation.

In another aspect, a method includes controlling a light source to emit light pulses having a duty cycle of less than 50%, detecting, at an array of demodulation pixels, light signals reflected by a target, sampling the signals from the demodulation pixels, and determining a time-of-flight or distance to the target based on the sampled signals.

According to another aspect, a time-of flight system includes a light source operable to emit light pulses toward a target, and a detector array (including demodulation pixels) operable to detect light signals reflected by the target at a wavelength of light emitted by the light source. A control unit is coupled to the light source and to the detector array, and is configured to coordinate modulation of the light source with sampling of the pixels so as to provide synchronous demodulation. The control unit also is configured to modulate the light source so as produce light pulses having a duty cycle sufficiently small that the demodulation pixels have a demodulation contrast of at least 90%.

Some implementations include one or more of the following features. For example, the time-of-flight system can include a processor operable to determine time-of-flight or distance information to the target based on signals from the detector array.

In some cases, the control unit is configured to modulate an output of the light source such that the light pulses emitted by the light source have a compression of at least 1.2, which in some cases, is in the range of 1.4-1.7, or in the range of 1.5-1.6. In some instances, the control unit is configured to modulate an output of the light source such that the light pulses emitted by the light source have a duty cycle of about 33.3%.

The control unit can be configured, for example, to modulate an output of the light source such that the light pulses emitted by the light source exhibit exponential decay or such that the light pulses emitted by the light source are substantially symmetrical. For example, in some instance, the rising and falling edges of the light pulses emitted by the light source have a similar shape and/or the rise and fall times of the light pulses emitted by the light source are similar.

Various implementations can provide one or more of the following advantages. For example, as noted above, using light pulse compression can help increase the demodulation contrast. In some cases, the light pulse shaping techniques can help reduce phase non-linearity and distance-calculation errors. The techniques described here can be used, for example, in measurement systems, as well as imaging systems in which a time-of-flight and/or distance information is obtained. In some instances, the time-of-flight and/or distance information can be used to reconstruct and display a three-dimensional image of a scene. The light compression techniques also can be used to provide reference signals.

Other aspects, features and advantages will be readily apparent from the following detailed description, the accompanying drawings, and the claims.

DETAILED DESCRIPTION

Figure 1:
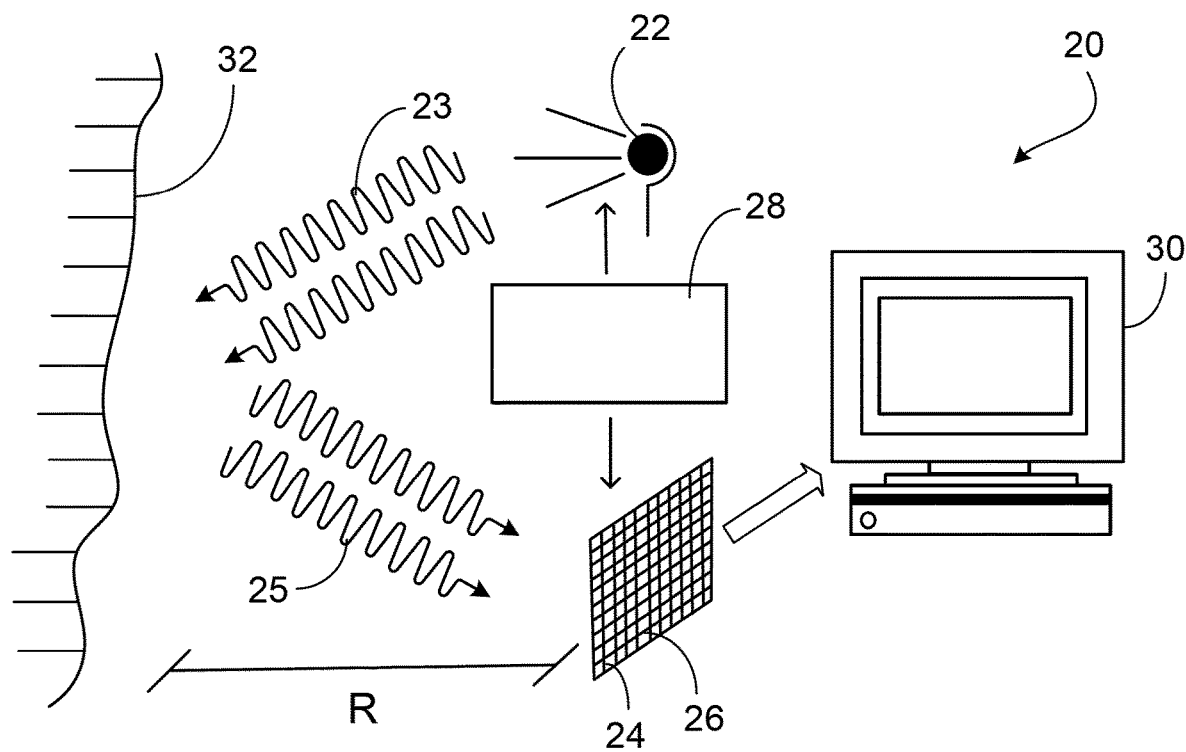
FIG. 1 illustrates an example of a TOF measurement and imaging system.

As shown in FIG. 1, a TOF measurement and/or imaging system 20 includes a light source 22 that produces modulated light 23 (e.g., infra-red or near infra-red). The modulated light is emitted toward a target such as a scene 32 that may include, for example, one or more objects. The light source 22 may be implemented, for example, as a vertical cavity surface emitting laser (VCSEL) or light emitting diode (LED). In some instances, the light source 22 includes a reflector that helps direct the light toward the scene 32. One or more lenses may be provided to help focus the light onto the scene 32. One or more objects in the scene 32 reflect at least part of the light signal 25 back toward a detector array 24 that includes lock-in (i.e., demodulation) pixels 26. An objective lens system can be provided so as to collect the reflected light and direct it toward the detector array 24. The detector array 24 can be implemented, for example, as a TOF detector chip that includes a two-dimensional CMOS or CCD array of spatially distributed light sensitive elements (i.e., pixels). The pixels 26 are operable to detect light having a wavelength emitted by the light source 22.

A control unit 28 is coupled to the light source 22 and to the detector array 24. The control unit 28, which can include a driver circuit as well as other electronics, can coordinate modulation of the light source 22 with sampling of the pixels 26 so as to provide synchronous demodulation. Depending on the distance to the scene 32, the captured image may be delayed in phase compared to the originally emitted light wave. The distance for each point in the scene 32 can be determined based on measuring the phase delays. The result of the acquisition is a depth map of the scene 32.

The sampled pixels signals can be read out to a data output interface such as a processor 30 (e.g., a personal computer, laptop or other processing device) configured to process the pixel signals to obtain the time-of-flight and/or distance information. In some implementations, the processor reconstructs a three-dimensional representation using the pixel samples generated by the detector chip such that a range to the scene is produced for each pixel on the chip. The processor 30 can include software tools to implement the transfer of pixel data, filtering and visualization of the data (e.g., displaying a three-dimensional image of the scene 32 based on the signals detected by the detector array 24).

Figure 2A:
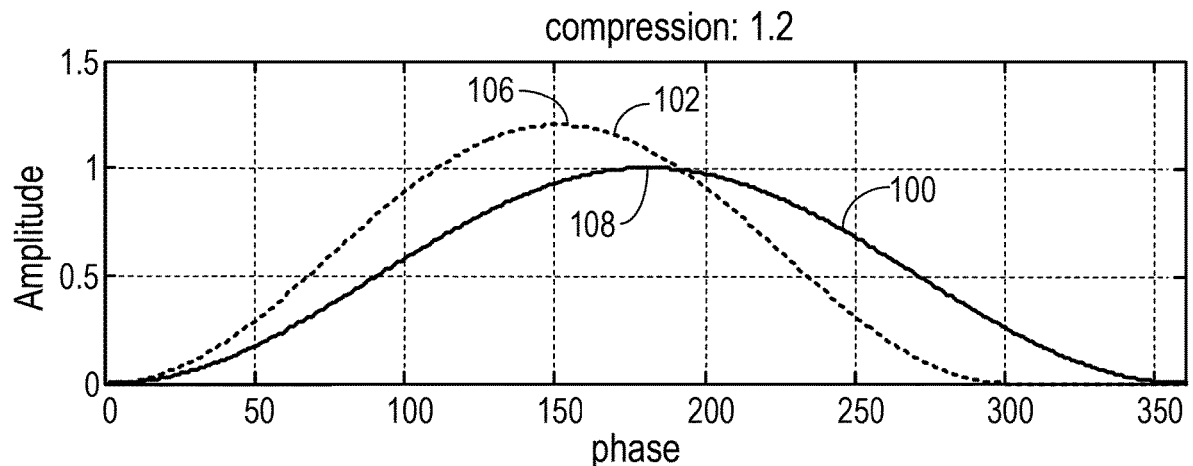
FIG. 2A is a graph of phase versus amplitude for compressed and uncompressed sinusoidal signals.

Illumination can be controlled, for example, by signals from the control unit 28 that modulate the light source 22 (i.e., turn the light source 22 on and off). In accordance with an aspect of the present disclosure, the light pulses are compressed (i.e., shortened) such that the duty cycle of the light pulses is less than 50% (i.e., the light pulses are ON less than fifty percent of the time). A comparative example is illustrated in FIG. 2A, which shows a first sinusoidal pulse 100 having a duty cycle of 50%, and a second sinusoidal pulse 102 having a compression of 1.2 and thus a duty cycle less than 50%. The second pulse 102 in this example is compressed by 20% such that its amplitude reaches a zero value at 300°, instead of 360° as occurs for the uncompressed pulse 100. Preferably, the total light energy of the compressed pulse 102, and thus the average light power, is the same as for the uncompressed pulse 100 having the 50% duty cycle. In this way, the peak amplitude value 106 of the compressed pulse 102 is greater than the corresponding peak value 108 of the uncompressed pulse 100.

Figure 2B:
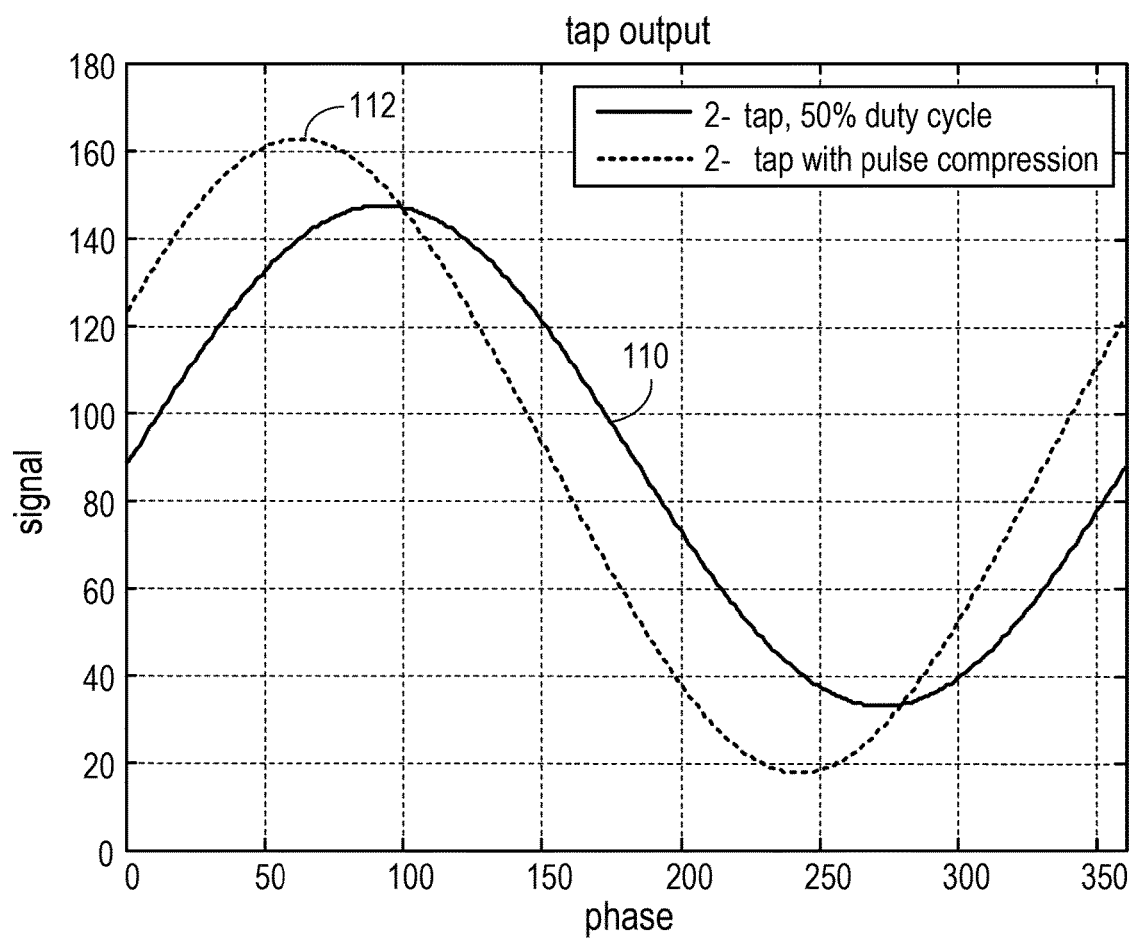
FIG. 2B is a graph illustrating the outputs of a 2-tap pixel using compressed and uncompressed sinusoidal signals.

One result that can be achieved by generating compressed light pulses from the light source 22 is that the demodulation contrast of the illumination can be increased. An example of the relative increase in demodulation contrast is illustrated in FIG. 2B, which shows simulated outputs for a 2-tap pixel. A first curve 110 represents the tap output for the 2-tap pixel assuming the light source 22 generates uncompressed light pulses (a 50% duty cycle); a second curve 112 represents the tap output for the 2-tap pixel assuming the light source 22 generates compressed light pulses with 1.2 compression. In this case, the demodulation contrast for the compressed illumination is about 80% (i.e., well-above the 63% theoretical maximum for the uncompressed illumination).

Figure 3A:
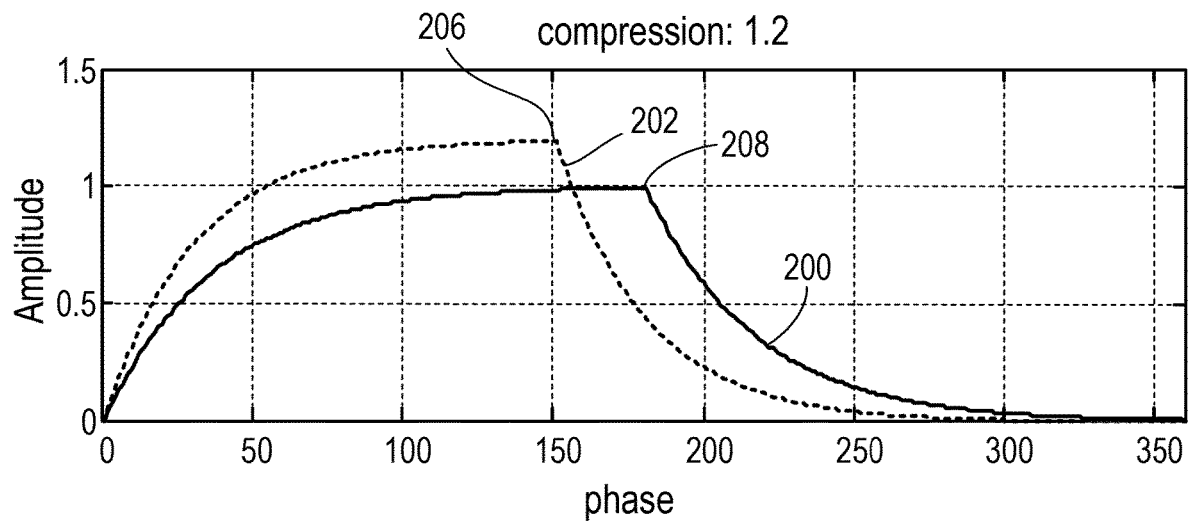
FIG. 3A is a graph of phase versus amplitude for compressed and uncompressed non-sinusoidal pulse signals.

Using compressed light pulses with a duty cycle of less than 50% can increase the demodulation contrast even if the light pulses are not sinusoidal. For example, FIG. 3A shows a comparative example for light pulses that exhibit exponential decay from their peak value (i.e., $1-\exp(t/\tau)$, where $\tau$ is the lifetime parameter). In this example, a first pulse 200 has a duty cycle of 50%, and a second pulse 202 has a compression of 1.2 and thus a duty cycle less than 50%. The second pulse 202 is compressed by 20% such that its amplitude reaches a zero value at 300°, instead of 360° as occurs for the uncompressed pulse 200. Preferably, the total light energy of the compressed pulse 202, and thus the average light power, is the same as for the uncompressed pulse 200 having the 50% duty cycle. In this way, the peak amplitude value 206 of the compressed pulse 202 is greater than the corresponding peak value 208 of the uncompressed pulse 200.

Figure 3B:
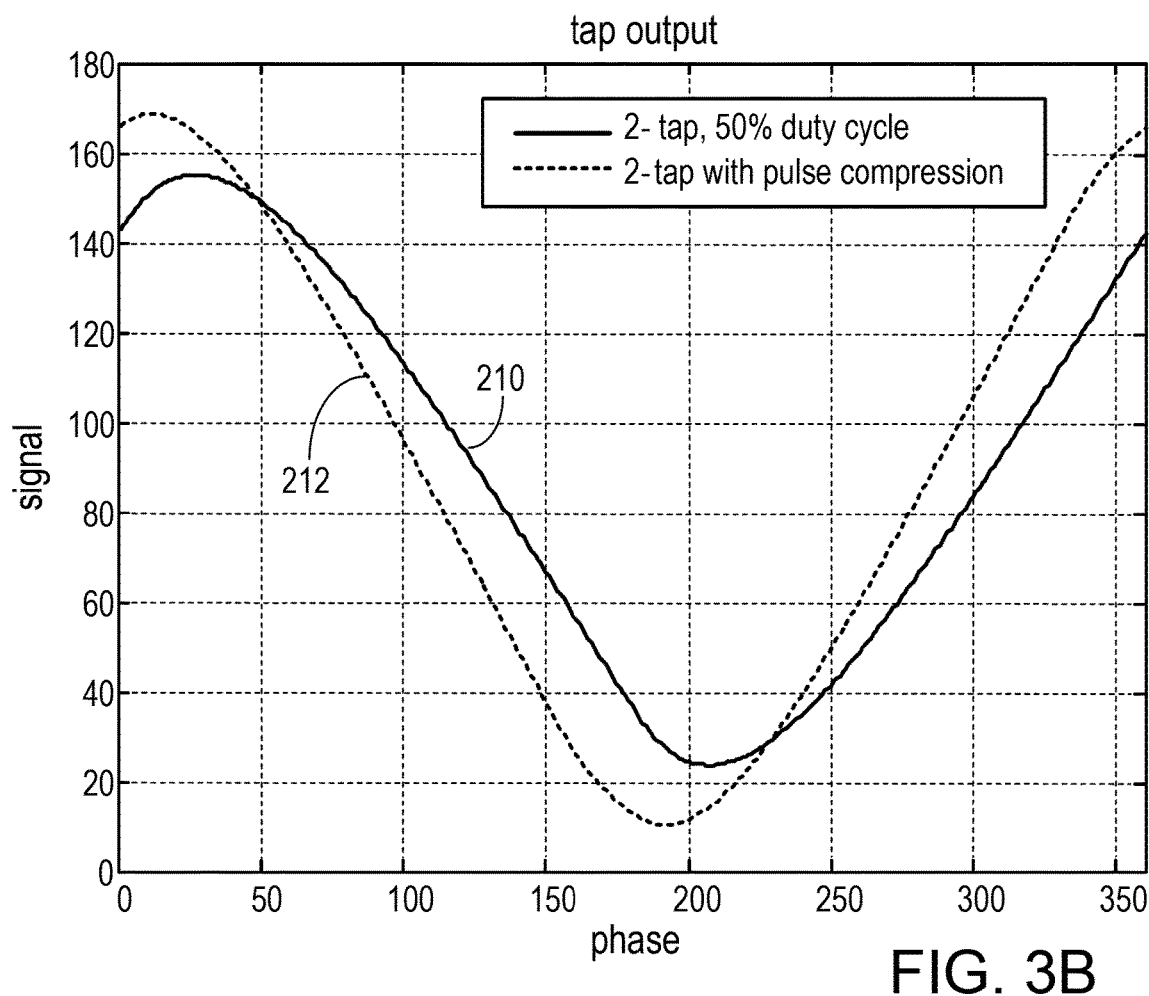
FIG. 3B is a graph illustrating the outputs of a 2-tap pixel using compressed and uncompressed non-sinusoidal pulse signals.

An example of the relative increase in demodulation contrast is illustrated in FIG. 3B, which shows simulated outputs for a 2-tap pixel based on non-sinusoidal light pulses such as those in FIG. 3A. A first curve 210 represents the tap output for the 2-tap pixel assuming the light source 22 generates uncompressed light pulses (i.e., a 50% duty cycle); a second curve 212 represents the tap output for the 2-tap pixel assuming the light source 22 generates compressed light pulses with 1.2 compression. In this case, the demodulation contrast for the compressed illumination is about 88% (i.e., well-above the 73% theoretical maximum for the uncompressed illumination in this case).

Figure 4A:
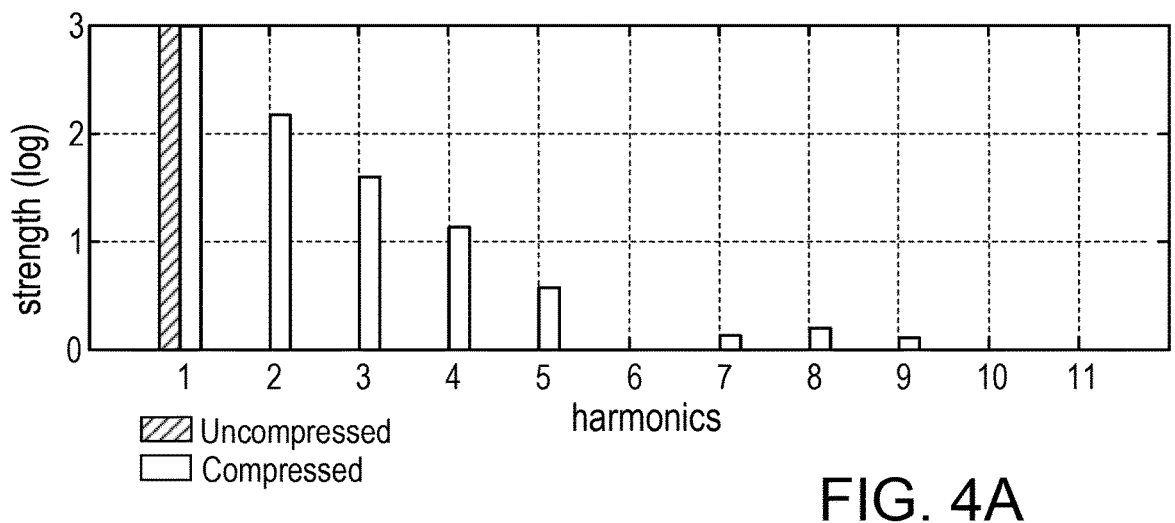
FIG. 4A is a graph indicating harmonics that are present for compressed and uncompressed sinusoidal signals.
Figure 4B:
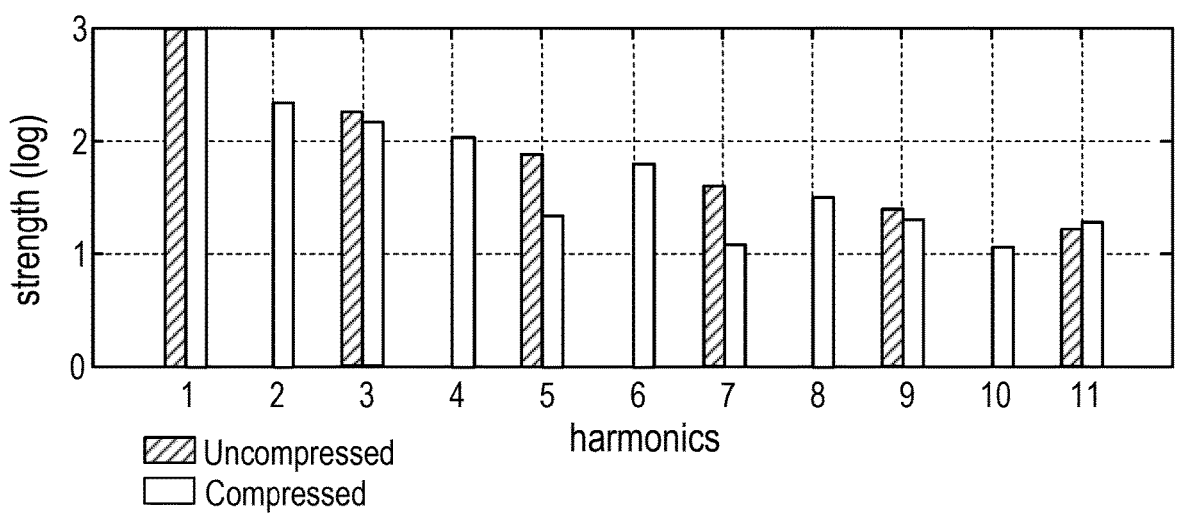
FIG. 4B is a graph indicating harmonics that are present for compressed and uncompressed non-sinusoidal pulse signals.

Although using illumination composed of compressed light pulses advantageously can increase the demodulation contrast, it may, in some cases, introduce distortion (i.e., errors between the actual and calculated distance R to the object in the scene 32). Such distortion can occur because of higher-order harmonics that are introduced as the result of compression and/or non-sinusoidal pulses. FIG. 4A, for example, illustrates the harmonics for the sinusoidal light pulses 100, 102 of FIG. 2A. Only the fundamental frequency is present for the pure uncompressed sinusoidal signal 100. On the other hand, additional harmonics appear for the compressed sinusoidal signal 102. Likewise, FIG. 4B illustrates the harmonics for the non-sinusoidal light pulses 200, 202 of FIG. 3A. Here, for both the uncompressed and compressed signals 200, 202, harmonics are present in addition to the fundamental frequency. However, whereas the uncompressed signal 200 displays only odd harmonics (i.e., 3, 5, 7, . . . ), the compressed signal 202 displays both odd and even harmonics (i.e., 2, 3, 4, 5, 6, 7, . . . ).

Figure 5A:
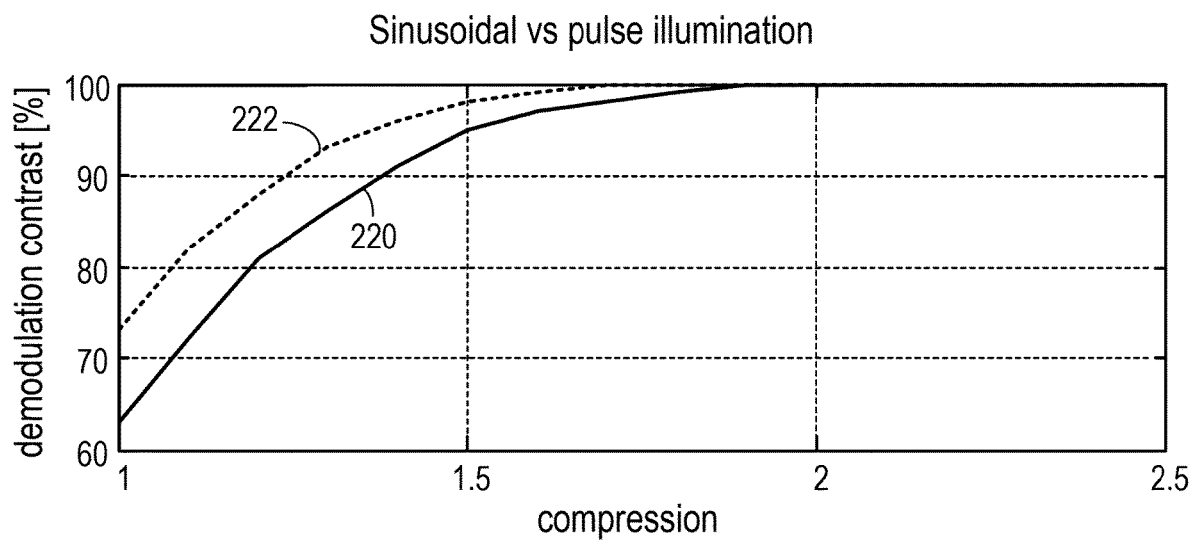
FIG. 5A is a graph of compression versus demodulation contrast for sinusoidal and non-sinusoidal pulse signals.
Figure 5B:
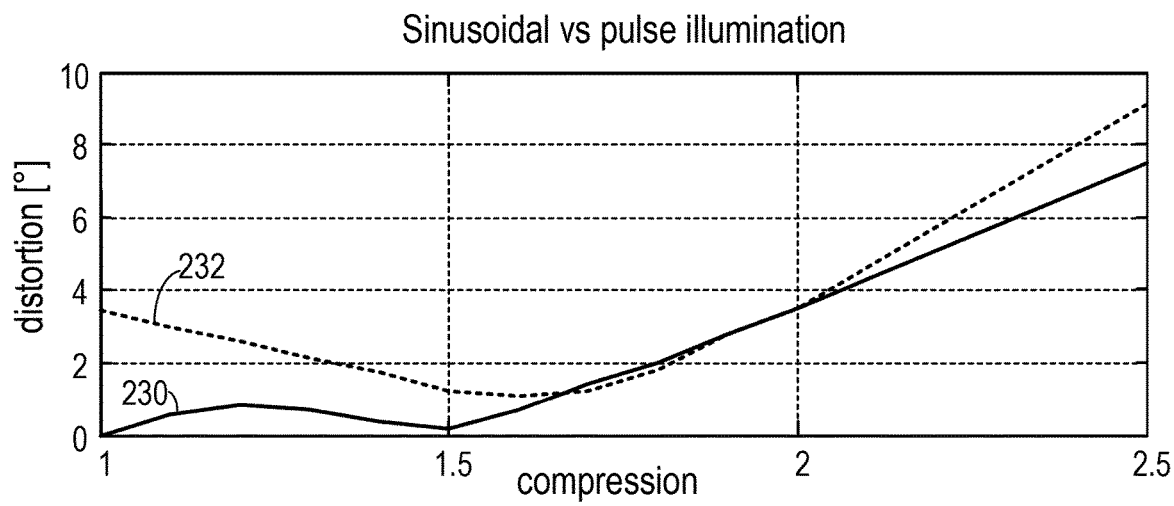
FIG. 5B is a graph of compression versus distortion for sinusoidal and non-sinusoidal pulse signals.

The potential distortion, however, can be reduced by judicial selection of the amount of compression. For example, the present inventors have discovered that, in some cases, compression in the range of 1.4-1.7, and in particular in the range of 1.5-1.6, can increase the demodulation contrast significantly, while resulting in only relatively low distortion. Simulated results are shown FIGS. 5A and 5B, and in Table 1 below. The simulated data indicates the percentage of demodulation contrast and the amount of maximum distortion at various compression values for sinusoidal pulses (as in FIG. 2A) and for pulses exhibiting exponential decay (as in FIG. 3A). In FIGS. 5A and 5B, curves 220, 230 represent, respectively, the demodulation contrast and distortion at various compression values for sinusoidal illumination; curves 222, 232 represent, respectively, the demodulation contrast and distortion at various compression values for illumination exhibiting exponential decay.

TABLE 1

| Compression | Sinus: Demodulation Contrast [%] | Max. Distortion [°] | Pulse: Demodulation Contrast [%] | Max. Distortion [°] |
|---|---|---|---|---|
| 1.0 | 63 | 0 | 73 | 3.4 |
| 1.1 | 72 | 0.55 | 82 | 3.0 |
| 1.2 | 81 | 0.8 | 88 | 2.6 |
| 1.3 | 86 | 0.7 | 93 | 2.1 |
| 1.4 | 91 | 0.35 | 96 | 1.7 |
| 1.5 | 95 | 0.14 | 98 | 1.2 |
| 1.6 | 97 | 0.7 | 99 | 1.1 |
| 1.7 | 98 | 1.4 | 100 | 1.2 |
| 1.8 | 99 | 2.0 | 100 | 1.8 |
| 1.9 | 99 | 2.8 | 100 | 2.8 |
| 2.0 | 100 | 3.5 | 100 | 3.5 |
| 2.5 | 100 | 7.5 | 100 | 9.1 |

As is apparent form the data in Table 1 and FIGS. 5A-5B, in some implementations, compression values of about 1.5 or about 1.6 can be particularly advantageous, as they result in relatively high demodulation contrast and relatively low distortion. Thus, in some implementations, the demodulation contrast is 90% or more, and the distortion is no greater than 1.2°. In some cases, a demodulation contrast of at least 95% can be achieved with relatively low distortion.

Figure 6:
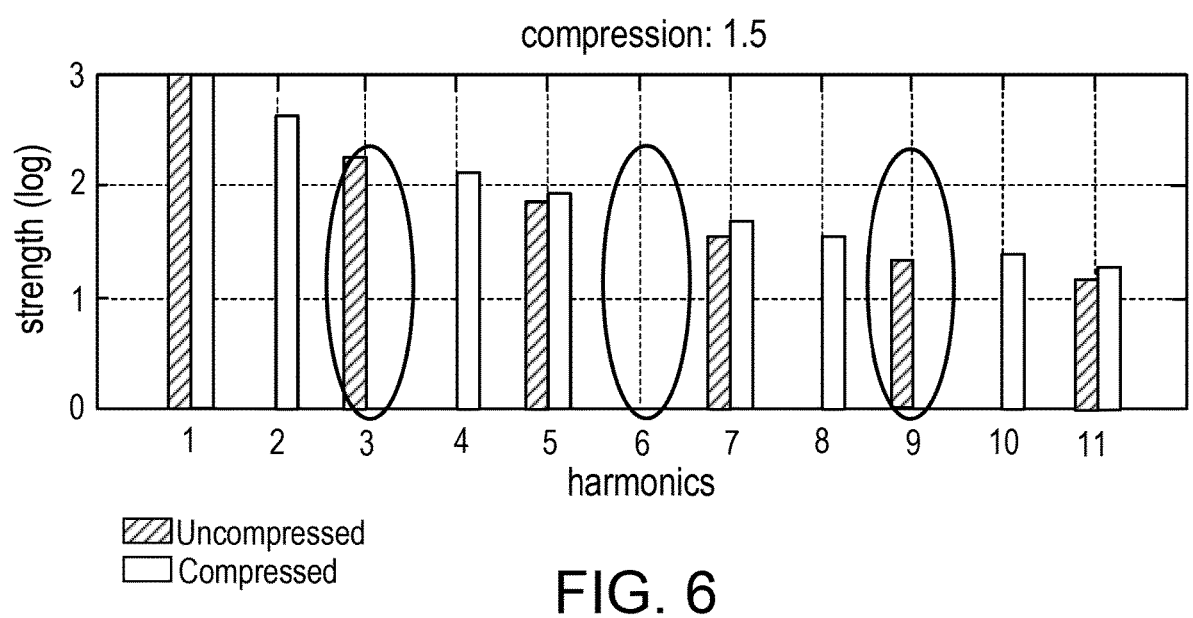
FIG. 6 is a graph illustrating the harmonics for a compressed signal having about a 33.3% duty cycle.

Although not critical for understanding or implementing the invention, it is believed that a compression of about 1.5, which is equivalent to a duty cycle of about 33.3%, results in every third harmonic (i.e., the $3^{rd}$, $6^{th}$, $9^{th}$, . . . ) disappearing or becoming very small. This situation is illustrated in FIG. 6, which shows the harmonics that are present for an uncompressed pulse and the harmonics that are present for a compressed pulse having a duty cycle of about 33.3%. In the case of the compressed pulse, some of the odd harmonics (e.g., $3^{rd}$, $9^{th}$, . . . ) disappear. As the presence of odd harmonics generally increases distortion, reducing the magnitude of at least some of the odd harmonics can help reduce distortion and result in smaller phase non-linearity.

In some cases, to help ensure that distortion is reduced, the rising and falling edges of the compressed illumination pulses should be substantially symmetrical. For example, the rising and falling edges preferably have the same or similar shape, and the respective rise and fall times should be the same or similar.

In general, the sample outputs of demodulation pixels are referred to as taps. In the foregoing description, examples are provided for 2-tap demodulation pixels in which the pixel provides two sample outputs. If the pixel is used, for example, for sampling a sinusoidally intensity-modulated light wave four times at equidistant steps of 0°, 90°, 180° and 270°, then two sequential measurements need to be performed. A first measurement outputs the samples, for example, at 0° and 180°, and a second integration cycle gives the samples at 90° and 270°. The techniques described here also can be used for 4-tap pixels in which all four samples are obtained within one acquisition cycle.

In some implementations, light pulse compression techniques can be combined with harmonic cancellation techniques. An example of such harmonic cancellation techniques is described in U.S. Patent Publication No. 2014/0218570, which is incorporated herein by reference. Combining both techniques can help optimize suppression of the harmonics that cause distortion, and also can help increase demodulation contrast. The light pulse shaping techniques can thus help maximize distance precision.

In some instances, the compressed pulses can be used for other purposes as well. For example, some TOF sensors include reference pixels in addition to the detection (i.e., demodulation) pixels. Whereas the detection pixels provide the primary signals for determining the distance to points of the target scene, reference pixels can be used to provide signals that help compensate for drift and to provide a zero distance measurement. Thus, in some implementations, it can be advantageous to redirect a small amount of light from the compressed light pulses to reference pixels.

Various implementations have been described by way of example. In some instances, various features described in connection with different ones of the examples above may be combined in the same implementation. Further, other modifications may be made without departing from the scope and spirit of the invention. Accordingly, other implementations are within the scope of the claims.

What is claimed is:
1. A time-of-flight system comprising:
a light source operable to emit light toward a target;
a detector array operable to detect light signals reflected by the target; and a control unit coupled to the light source to modulate the light source such that the light source emits light pulses having falling edges which exponentially decay from peak values of the light pulses and rising edges which are similarly shaped to the falling edges, wherein the light pulses each have a compression in a range of 1.1-1.9 such that the light pulses have a duty cycle of less than 50% and include a portion of 0 intensity after the falling edge and before the rising edge of a subsequent light pulse, wherein the control unit also is coupled to the detector array and is operable to coordinate modulation of the light source with sampling of pixels in the detector array so as to provide synchronous demodulation.

2. The time-of-flight system of claim 1 further including a processor operable to obtain signals from the detector array indicative of the detected light signals, wherein the processor is operable to determine time-of-flight or distance information to the target based on the signals from the detector array.

3. The time-of-flight system of claim 1 wherein the control unit is configured to modulate an output of the light source such that the light pulses emitted by the light source have a compression of at least 1.2.

4. The time-of-flight system of claim 1 wherein the control unit is configured to modulate an output of the light source such that the light pulses emitted by the light source have a compression in a range of 1.4-1.7.

5. The time-of-flight system of claim 1 wherein the control unit is configured to modulate an output of the light source such that the light pulses emitted by the light source have a compression in a range of 1.5-1.6.

6. The time-of-flight system of claim 1 wherein the control unit is configured to modulate an output of the light source such that the light pulses emitted by the light source have a duty cycle of about 33.3%.

7. The time-of-flight system of claim 1 wherein the control unit is configured to modulate an output of the light source such that the light pulses emitted by the light source are substantially symmetrical.

8. The time-of-flight system of claim 7 wherein the control unit is configured to modulate an output of the light source such that rise and fall times of the light pulses emitted by the light source are similar.

9. A method comprising:

controlling a light source to emit light pulses having falling edges which exponentially decay from peak values of the light pulses and rising edges which are similarly shaped to the falling edges, wherein each of the light pulses have a compression in a range of 1.1-1.9 such that the light pulses have a duty cycle of less than 50% and include a portion of 0 intensity after their falling edge and before the rising edge of a subsequent light pulse;

detecting, at an array of demodulation pixels, light signals reflected by a target;

sampling the signals from the demodulation pixels; and determining a time-of-flight or distance to the target based on the sampled signals.

10. The method of claim 9 wherein the light pulses emitted by the light source have a compression of at least 1.2.

11. The method of claim 9 wherein the light pulses emitted by the light source have a compression in a range of 1.4-1.7.

12. The method of claim 9 wherein the light pulses emitted by the light source have a compression in a range of 1.5-1.6.

13. The method of claim 9 wherein the light pulses emitted by the light source have a duty cycle of about 33.3%.

14. The method of claim 9 including coordinating modulation of the light source with sampling of pixels in the detector array so as to provide synchronous demodulation.

15. A time-of flight system comprising:

a light source operable to emit light pulses toward a target;

a detector array operable to detect light signals reflected by the target at a wavelength of light emitted by the light source, the detector array including demodulation pixels;

a control unit coupled to the light source and to the detector array, the control unit configured to coordinate modulation of the light source with sampling of the pixels so as to provide synchronous demodulation;

the control unit further configured to modulate the light source so as produce light pulses having a duty cycle sufficiently small that the demodulation pixels have a demodulation contrast of at least 90% and wherein the control unit is configured to modulate an output of the light source such that the light pulses emitted by the light source have falling edges which exhibit exponential decay from a peak value of the light pulses and rising edges similarly shaped to the falling edges, wherein the light pulses each have a compression in the range of 1.1 to 1.9 such that they have duty cycle of less than 50% and include a portion of 0 intensity after the falling edge and before the rising edge of a subsequent light pulse.

16. The time-of-flight system of claim 15 wherein the demodulation pixels are 2-tap pixels.

17. The time-of-flight system of claim 15 wherein the control unit is configured to modulate the light source so as produce light pulses having a duty cycle sufficiently small that the demodulation pixels have a demodulation contrast of at least 95%.

* * * * *